W. C. FORCE.
MACHINE CLAMP.
APPLICATION FILED MAR. 11, 1916.
1,255,729. Patented Feb. 5, 1918.
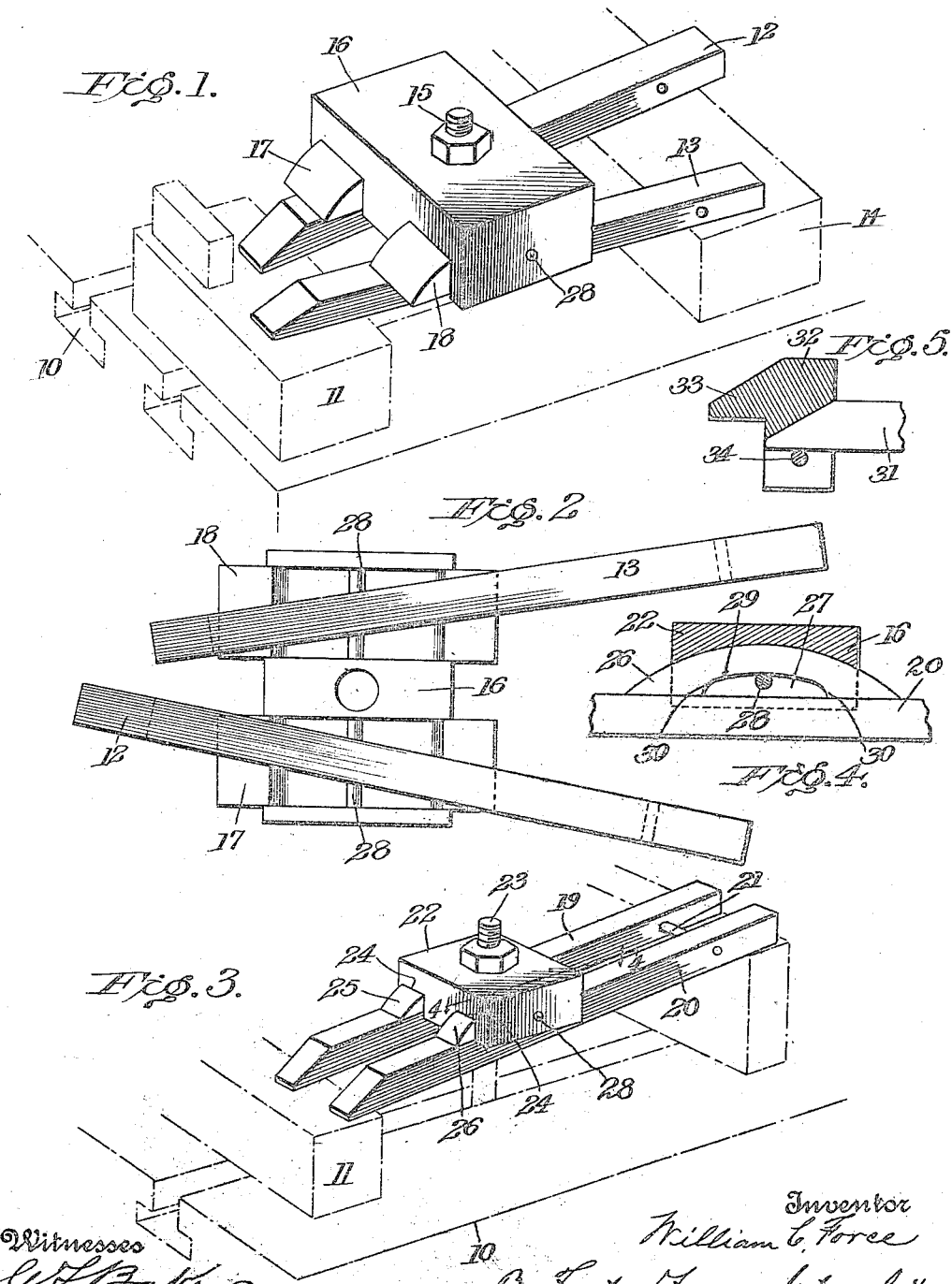

UNITED STATES PATENT OFFICE.

WILLIAM C. FORCE, OF NORTH PLAINFIELD, NEW JERSEY, ASSIGNOR OF ONE-HALF TO WILLIAM M. KELLY, OF JERSEY CITY, NEW JERSEY.

MACHINE-CLAMP.

1,255,729.  Specification of Letters Patent.  Patented Feb. 5, 1918.

Application filed March 11, 1916. Serial No. 83,679.

*To all whom it may concern:*

Be it known that I, WILLIAM C. FORCE, a citizen of the United States, and resident of North Plainfield, Somerset county, State of New Jersey, have invented certain new and useful Improvements in Machine-Clamps, of which the following is a specification.

This invention relates to clamping devices designed particularly for use on machine tools such as planers, boring mills, etc., and has for its objects the provision of a comparatively simple clamp which shall be adapted to securely clamp the work even though the clamping bars engage an uneven surface of the work. It is also the object of the invention to provide an improved form of clamping device in which the usual clamping bars may be arranged at different angles with relation to each other and at different angles with relation to the table upon which the work is clamped.

Other objects and the features of novelty will be apparent from the following description taken in connection with the accompanying drawings, in which:—

Figure 1 is a perspective view of a clamp embodying the invention and shown in connection with a work table and in position to clamp the work;

Fig. 2 is a bottom plan of the clamp shown in Fig. 1;

Fig. 3 is a perspective view similar to Fig. 1 but showing another form of the invention;

Fig. 4 is a detail section substantially on line 4—4 of Fig. 3; and

Fig. 5 is a detail section showing a modified form of clamping bar.

Referring to the drawings, 10 indicates a work table of a machine upon which the work 11 is to be clamped. The clamp, in the form shown in Figs. 1 and 2 comprises clamping bars 12 and 13, these bars resting at one end upon a suitable supporting block 14 and engaging the work with their opposite ends. As shown in the drawings the parts 12 and 13 may be arranged at an angle to each other and are clamped on the work and the supporting block 14 by means of a bolt 15 which coöperates with a bridging piece or cross member 16, the latter having grooves or seats to receive the circular segments 17 and 18 which engage the upper surface of the bars 12 and 13. The segments 17, 18, are adjustable in the bridging piece or cross member 16 about an axis extending transversely of the bars for the purpose of permitting the bars to be arranged in an inclined position relatively to the work table 10.

In the form of the invention illustrated in Fig. 3 the clamping bars 19 and 20 are pivotally connected together by the pin 21 and the bridging piece or cross member 22, with which the bolt 23 coöperates is provided with grooves or seats 24 for the segments 25 and 26 which are substantially of the same width as the bars 19 and 20. The grooves 24 are of sufficient depth so that the bars 19 and 20 extend into them for a slight distance and are held securely in position by the bridging piece 22. Referring to Fig. 4 it will be seen that the segment 26, which is similar to the segment 25 has a recess 27 in its underside through which the pin 28 passes for the purpose of securing the segment to the bridging piece 22. The part 29 of the surface of the recess 27 is concentric with the outer surface of the segment but the portions 30 are so formed as to prevent the segment from becoming detached from the bridging piece.

Referring to Fig. 5 it will be seen that the clamping bar 31 is provided with an extension member 32 having a projection 33 thereon which is adapted to engage the work. The member 32 is recessed to receive the end of the bar 31 and the pin 34 is provided to secure the member on the bar and also to transmit the clamping force from the bar to the member. The member 32 may be of any desired length so that the bar 31, when provided with the extension member will be adapted to engage surfaces which are above the plane of the bar. In using the clamp the bars are arranged to suit the particular piece of work to be clamped the segments being adjusted in the bridging piece so that the latter is supported substantially normal to the axis of the clamping bolt. The nut on the clamping bolt is then tightened and the work thereby secured, the lower end of the clamping bolt being provided with the usual head engaging a T slot, the latter being indicated in the drawings.

Having thus described the invention what is claimed and desired to be secured by Letters Patent is:

1. In a device of the class described, the combination of a pair of clamping bars pivoted together at one end for movement independent of each other and adapted to engage the work to be clamped with their other ends, a cross member connecting said bars, and a bolt coöperating with said member and the axis of which is substantially at right angles to the axis of the pivot of said bars.

2. In a device of the class described, the combination of a plurality of clamping bars, a cross member connecting said bars, a clamping bolt coöperating with said cross member whereby a clamping force is exerted thereon and extensions removably secured to the ends of said bars and adapted to engage the work above the planes of the bars.

3. In a device of the class described, the combination of a plurality of clamping bars, a cross member over said bars and parts intermediate the cross member and the bars adapted to be adjusted with the bars about axes extending transversely of the bars and a clamping bolt coöperating with the said cross member.

4. In a device of the class described, the combination of a plurality of clamping bars, circular segments arranged on said bars, a cross member having curved seats engaging said segments, the segments being shiftable in said seats to different positions about an axis extending transversely of the bars and a clamping bolt coöperating with the said member.

5. In a device of the class described, the combination of a plurality of clamping bars, circular segments on said bars each being recessed on the side toward the bars, a cross member mounted on said segments, the segments being adjustable in said cross piece, means extending through the said recesses for connecting the segments to said cross member and a clamping bolt coöperating with said member.

In testimony whereof I affix my signature.

WILLIAM C. FORCE.

Copies of this patent may be obtained for five cents each, by addressing the "Commissioner of Patents, Washington, D. C."